Oct. 4, 1927.

G. W. PACKER 1,644,268

TROLLEY SUPPORT

Filed Dec. 25, 1926

Inventor
Glenn W. Packer
by Clarence F. Poole
Attorney

Patented Oct. 4, 1927.

1,644,268

UNITED STATES PATENT OFFICE.

GLENN W. PACKER, OF CHICAGO, ILLINOIS, ASSIGNOR TO GOODMAN MANUFACTURING COMPANY, OF CHICAGO, ILLINOIS, A CORPORATION OF ILLINOIS.

TROLLEY SUPPORT.

Application filed December 25, 1926. Serial No. 157,004.

This invention relates to new and useful improvements in trolley supports, particularly adapted for use with a mine locomotive, and has as its particular object to provide a new and improved trolley pole and support for use on haulage locomotives in and about mines. Other objects of the invention will appear from time to time as the description proceeds.

Figure 1:
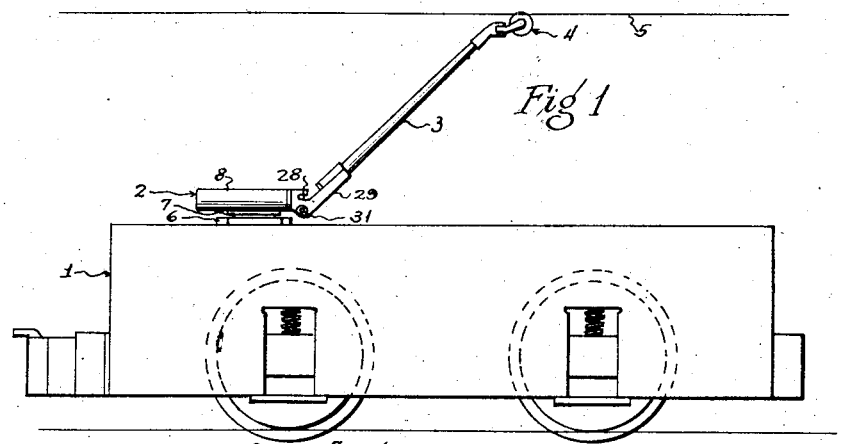
Figure 1 is a side elevation of the device embodying my invention as used on a mine locomotive.
Figure 2:
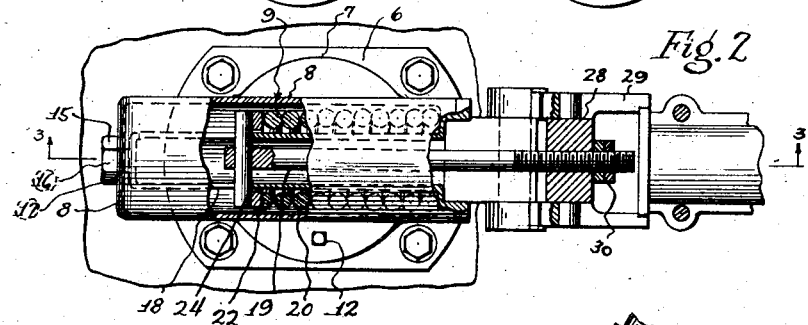
Figure 2 is an enlarged plan view of the device with the trolley pole in a horizontal position and with parts broken away to more clearly show the details of the invention.
Figure 3:
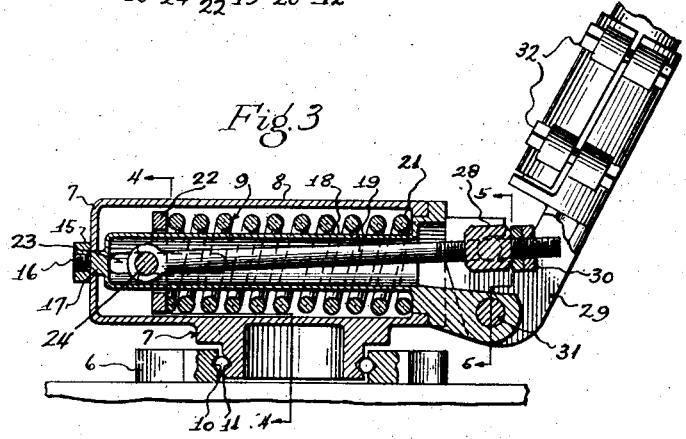
Figure 3 is an enlarged partial vertical sectional view of the device shown in Figure 1, taken through the longitudinal center line thereof.
Figure 4:
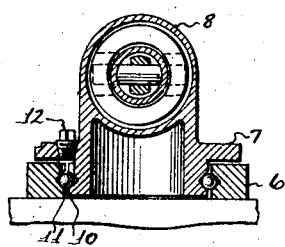
Figure 4 is a sectional view taken on line 4—4 of Figure 3.
Figure 5:
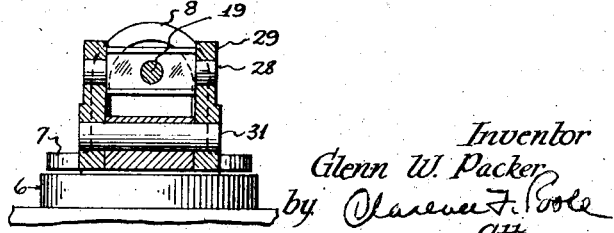
Figure 5 is a sectional view taken on line 5—5 of Figure 3.

Referring now to the details of the drawings:

I have shown a locomotive 1 with a trolley support 2 thereon, of the type embodied in my invention. This support holds a suitable trolley pole 3 with a trolley harp and wheel 4 thereon against a trolley wire 5 to provide a means for transmitting an electric current from said trolley wire to the locomotive 1.

The trolley pole support 2 is provided with a base 6 adaptable to be fastened on the top of a locomotive. Said base supports a member 7 rotatable therein. Supported on the upper portion of this member 7 and integral therewith, is a horizontal cylindrical portion 8 open at one end to receive a spring actuated supporting means 9 for supporting the trolley pole 3 and holding the trolley wheel 4 against the trolley wire 5 at an equal pressure in all positions of the pole.

The base 6 is provided with an annular groove 10 on its inner periphery to form one half of a ball race for a ball bearing. The other half of said race is formed from the outer periphery of the supporting member 7 which has a corresponding annular groove 11 thereon. Suitable balls are inserted in the race formed by the annular grooves 10 and 11, through an aperture 12 to provide a ball bearing socket for the trolley pole 2. Such a support makes it more easy for the motorman to switch the pole when changing the direction of travel of the locomotive and lessens the tendency of the trolley wheel to jump off the wire when rounding sharp curves or where the trolley wire is in poor condition.

The spring actuated supporting means 9 is held in the cylindrical socket 8 by a nut 15 threaded on a projection 16 from said supporting means which passes through an aperture 17 in the rearward end of the socket 8. Said means comprises a hollow member 18 of a circular cross section open at its forward end but closed at its rearward end, extending the length of the socket 8. The inner portion of the member is adapted to receive a connecting rod 19 while a spring 20 fits on the outer portion of said member. The forward portion of said spring abuts a shoulder 21 on the member 18 and the rearward portion of said spring abuts a collar 22 longitudinally slideable on the member 18. Longitudinal slots 23 are provided in the member 18 to serve as a guiding means for the connecting rod 19 and to provide a means whereby the connecting rod 19 may be connected to the spring 20. The connecting rod 19 is operatively connected to the spring 20 through the collar 22 by means of a pin 24 which is adapted for longitudinal movement in the slots 23 and serves to pivotally connect the rearward portion of said rod to the collar 22, and also serves as a guiding means for the connecting rod 19. The forward portion of the connecting rod 19 passes through a member 28 midway between the ends of said member. The member 28 is pivotally mounted in a socket 29 for the trolley pole 3. The forward portion of the connecting rod 19 has locking nuts 30 threaded thereon which bear against the member 28 and thus connect the spring 20 with the trolley socket 29. The trolley socket 29 is in turn pivotally mounted to a forwardly projecting portion of the member 18 at 31. This pivotal point is sufficiently below the pivotal center of the member 28 to allow ample leverage for the connecting rod 19 to pull the socket 29 with a trolley pole therein in an upright position by means of the spring 20. It may here be noted that the pull from the spring 20 to the trolley pole socket 29 is practically a straight line in all positions of said trolley pole and the pull on the trolley pole is substantially equal in all positions of said trolley pole. Therefore as the locomotive travels about the mine and where the distance from the wire to the deck of the locomotive is unequal the pressure of the trolley wheel on said wire will be substantially equal in all the various heights of said wire.

The trolley pole 3 is received in the upper portion of the socket 29 and said portion is split to afford a means for receiving different sized and types of poles and to provide a means to hold the trolley pole tight in its socket. These split portions are held together by suitable nuts and bolts 32. Tightening of the nuts draws the split portions together and holds said trolley pole in its socket.

Although I have shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated in the drawings, excepting as it may be limited by the appended claims.

I claim as my invention:

1. In combination with a trolley pole supporting means, a base, a horizontally disposed cylinder, pivotally mounted on a vertical axis in said base and open at one end for receiving and encasing spring actuating means for a spring actuated trolley pole supporting means therein.

2. In combination with a trolley pole support, a base, a horizontally projecting cylinder pivotally mounted thereon, open at one end for receiving the actuating means of a spring actuated trolley pole supporting means therein, said trolley pole supporting means comprising a hollow member having a spring means on its outer portion and a connecting rod on its inner portion connectible with said spring means at one end, a guiding means for said rod, and a means to pivotally connect the other end of said rod with a trolley pole socket pivotally mounted to a projection of the aforementioned hollow member at a point below the point of connection of said rod to said trolley pole support.

3. In combination with a trolley pole support, a base, a horizontally projecting cylinder pivotally mounted thereon, open at one end for receiving the actuating means of a spring actuated trolley pole supporting means therein, said trolley pole supporting means comprising a hollow member having a spring means on its outer portion abutting a portion of said hollow member at one end and a collar at the other end, and a connecting means from said collar to a connecting rod on the inner portion of said hollow member.

4. In combination with a trolley pole support, a base, a horizontally projecting cylinder pivotally mounted thereon, open at one end for receiving the actuating means of a spring actuated trolley pole supporting means therein, said trolley pole supporting means comprising a hollow member having a spring means on its outer portion abutting a portion of said hollow member at one end and a collar at the other end, a connecting means from said collar to a connecting rod on the inner portion of said hollow member, and a connecting and guiding means from said collar to a connecting rod on the inner portion of said hollow member.

Signed at Chicago, in the county of Cook and State of Illinois, this 23rd day of December, A. D. 1926.

GLENN W. PACKER.